United States Patent [19]

Oldham et al.

[11] 4,121,906
[45] Oct. 24, 1978

[54] RESIN MIXING AND DELIVERY DEVICE

[76] Inventors: Dale R. Oldham, 7028 N. 11th St., Phoenix, Ariz. 85020; James F. Peterson, Jr., 2502 E. North La., Phoenix, Ariz. 85028

[21] Appl. No.: 737,661

[22] Filed: Nov. 1, 1976

[51] Int. Cl.² .......................... B01F 3/08; B01J 8/00; B01J 13/00
[52] U.S. Cl. ................................ 422/133; 252/359 E; 366/336
[58] Field of Search .................. 23/252 R, 288 E; 252/359 E; 137/607; 259/4 R, 18-27; 261/DIG. 26; 366/536

[56] References Cited

U.S. PATENT DOCUMENTS

| | | | |
|---|---|---|---|
| 2,702,051 | 2/1955 | Welty et al. | 137/607 X |
| 2,860,856 | 11/1958 | Bauer | 252/359 E X |
| 2,965,134 | 12/1960 | Pouppirt, Jr. | 137/607 X |
| 2,980,140 | 4/1961 | McMillan | 137/607 X |
| 3,068,074 | 12/1962 | Boekemeier | 23/252 R |
| 3,330,536 | 7/1967 | Eptalhiar | 252/359 E X |
| 3,353,918 | 11/1967 | Perrin | 23/252 R |
| 3,618,856 | 11/1971 | Sachnik | 252/359 E X |
| 3,902,850 | 9/1975 | Lehnert | 23/252 R |
| 4,021,386 | 5/1977 | Lindstrom | 261/DIG. 26 X |

Primary Examiner—Morris O. Wolk
Assistant Examiner—Michael S. Marcus
Attorney, Agent, or Firm—Dean, Flickinger & Robertson

[57] ABSTRACT

Very compact resin mixing and delivery device for use in mixing and delivering such resin as urea formaldehyde with foaming agents or the like and for delivering such mixtures to a delivery conduit which is adapted for applying the resin and foaming agent in place so that it may develop into a cured cellular foam like hard filler or body for use in various applications such as building insulation, wall reinforcing and filling various voids or cavities in a great variety of structures.

13 Claims, 14 Drawing Figures

RESIN MIXING AND DELIVERY DEVICE

BACKGROUND OF THE INVENTION

The prior art foam and resin mixing devices have been large, bulky, unwieldy to handle and difficult to operate. In addition, prior art devices have lacked suitable controls so that simplicity of manual operation may be attained and whereby accurate dispensation and mixing of resins and foaming agents may be accomplished. Further, prior art devices have been difficult to maintain due to the requirement for maintenance, such as cleaning the resin from complex areas of the devices of the prior art.

In various devices of the prior art commonly used for spraying mixtures of foaming agent and urea formaldehyde, a great many tubular parts and valves have been assembled into large bulky configurations and these devices have been difficult to operate, as well as to carry and handle, during the placement of foam material and further, these devices have been difficult to maintain due to the fact that the resin has set up in them throughout the various areas such as the mixing chamber or the like and when the resin reacts and sets up in the prior art devices they are very difficult to maintain and it is always important that such devices be immediately cleaned after use due to the fact that the resins start to react and set up into a hard block of foam in the various passages of the prior art devices.

SUMMARY OF THE INVENTION

The foam and resin mixing and delivery device of the invention comprises a very compact conduit structure preferably formed of a single block of material with passages therein. The block of material constitutes a conduit means and is provided with fixtures thereon which may be engaged with a hip belt disposed around the operator's hips so that the resin and foam delivery conduit in connections with the block conduit structure of the invention may readily be handled while the foam and resin mixing conduit structure is conveniently carried by the operator. The foam and resin mixing and delivery device of the invention is a very light weight, compact structure compared to prior art devices and contains many novel features which contribute to the simplicity of operation, the efficiency of operation and the reduction of maintenance of devices used for the mixing of foam and resin and particularly resin such as urea formaldehyde and its appropriate foaming agent.

The invention comprises a unitary conduit means formed of a single block of material wherein a cam shaft is moveably mounted and which controls three valves adapted to control the flow of resin, compressed air and a foaming agent. Additionally, novel additional air flow control adjusting valve means is provided as well as compressed air blow off valve means which are manually operable. The adjustable air flow controlling valve is adapted for use in adjusting the mixture of foaming agent and resin, while the blow off valve is adapted to independently be operable to admit large amounts of compressed air into the passages of the device for blowing out and cleaning the mixing chamber, as well as a downstream resin delivery conduit in connection therewith.

The device of the invention is provided with a resin delivery nozzle, which is disposed downstream of the mixing chamber or at the outlet of the mixing chamber of the invention so that reacting resin is not collected in the mixing chamber and is therefore not a problem as far as maintenance is concerned.

The mixing chamber of the invention comprises a novel removeable cartridge which comprises a hollow cylindrical body with foraminous inlet and outlet ends and wherein plastic beads are disposed such that compressed air and foaming agent are forced through the cartridge from the inlet to the outlet and wherein the beads provide for a tortuous path which causes mixing of the compressed air and the foaming agent so that, as the foam is delivered at the outlet of the aforementioned cartridge, resin is sprayed into the foam at the outlet of the cartridge and at the delivery area of the device so that the mixture of the foaming agent and the resin enters directly into a delivery tube which delivers the mixture to an area of placement wherein reaction of the foaming agent and the resin causes curing and formation of dense foam bodies, such as insulation bodies or fillers to be used in connection with various structures and for various purposes.

Accordingly, it is an object of the present invention to provide a very compact, light weight and readily operable foam and resin mixing device for use in connection with foam resin production, such as that commonly known as the urea formaldehyde resin foam.

Another object of the invention is to provide a unitary conduit means having control, shut off and blow off valves all in connection therewith and which may be worn on the belt of an operator so that the foam and resin delivery conduit may readily be handled while the operator may exercise control of the mixing device of the invention with one hand.

Another object of the invention is to provide a novel foam and resin mixing and delivery device having very simple valve control means for controlling three valves; namely, urea resin, compressed air and foaming agents, all operated in connection with a common cam shaft.

Another object of the invention is to provide a foam and resin mixing and delivery device having a novel compressed air blow off means adapted to clean the foam mixing chamber and wherein the resin nozzle is downstream of the mixing chamber so as to prevent resin from reacting and setting up in the foam mixing chamber.

Another object of the invention is to provide a foam and resin mixing and delivery device which is very simple and economical of construction in proportion to its utility and which is very durable and requires a minimum amount of maintenance.

Another object of the invention is to provide a foam and resin mixing and delivery device which may be worn on the belt of an operator and wherein all of the foam and resin adjustments may be made by one hand of the operator, while handling the foam delivery conduit at the outlet of the mixing and delivery device of the invention.

Further objects and advantages of the invention may be apparent from the following specification, appended claims and accompanying drawings.

DESCRIPTION OF THE PREFERRED EMBODIMENTS

Figures 1, 2:
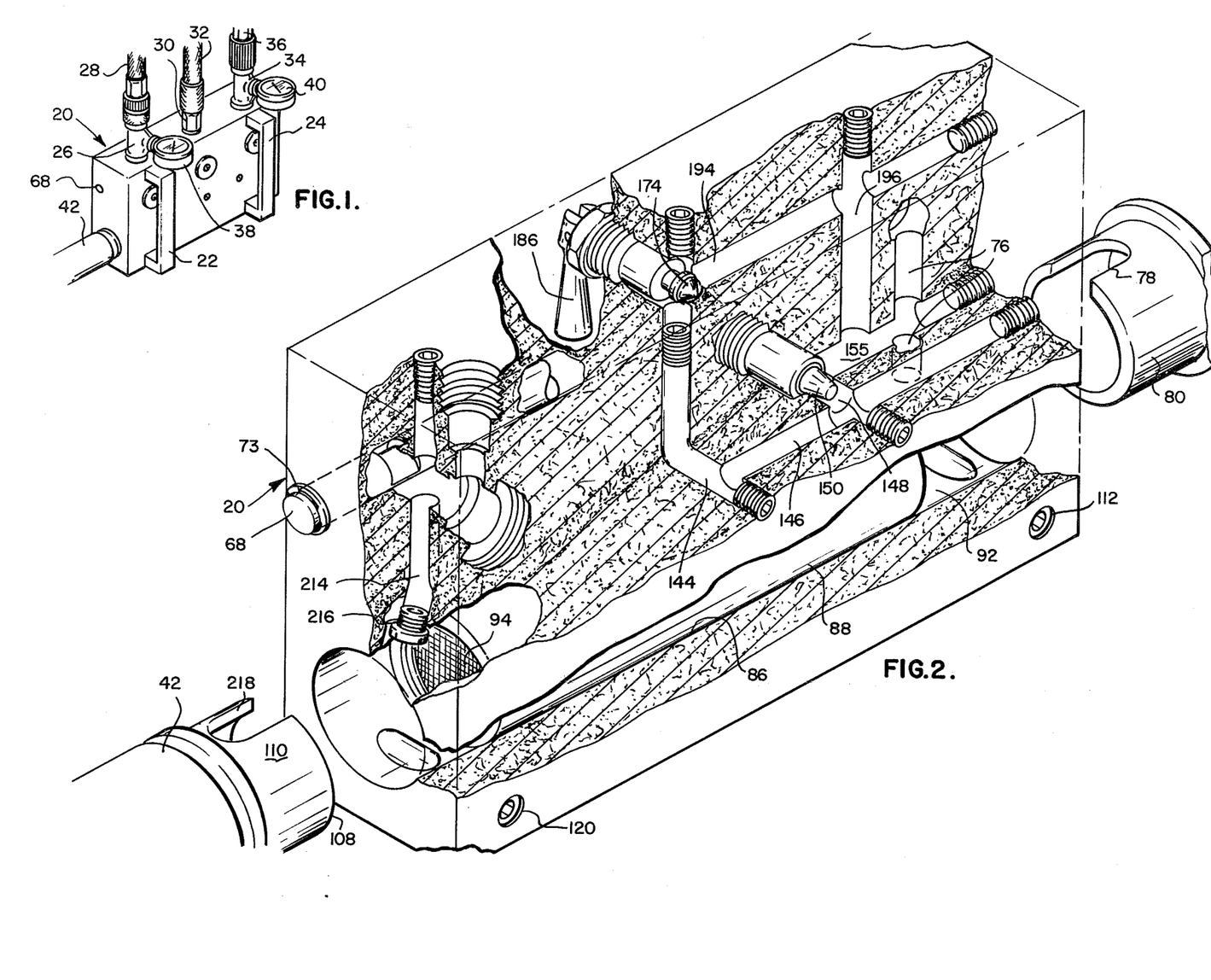
FIG. 1 is a perspective view of the foam and resin mixing and delivery device of the invention shown with flexible hoses adapted to delivery urea resin, compressed air and a foaming agent to the device of the invention and also showing a foam and resin delivery conduit in connection therewith.
FIG. 2 is an enlarged side elevational view of the device of the invention showing portions broken away and in section to amplify the illustration.

As shown in FIG. 1, the foam and resin mixing and delivery device of the invention is provided with a body 20 which constitutes a conduit means. The body 20 is preferably a single block of material such as "Delrin" plastic or the like. This body 20 is provided with a pair of large belt loops 22 and 24 so that the body 20 may be carried on a belt around the hips of an operator. The body carries a fitting 26 connected to a flexible hose 28 for conducting resin into the conduit means of the invention. Additionally, a fitting 30 is carried by the body 20 and this fitting 30 is coupled to a flexible hose 32 which conducts compressed air into the conduit means of the invention. A third fitting 34 is coupled to a flexible hose 36 which conducts an aqueous solution of detergent foaming agent into the conduit means within the body 20, all as will hereinafter described in detail.

Coupled to the fitting 26 is a pressure indicating guage 38 and coupled to the fitting 34 is a pressure indicating guage 40, all as will be hereinafter described in detail.

Coupled to the body 20 and communicating with the conduit means therein is a delivery tube fitting 42 which is coupled to a flexible hose for delivering a mixture of foam and resin to a use location where the foamed resin is adapted to cure and form a solid cellular foam structure in connection with various other structures as may be desired.

Figure 3:
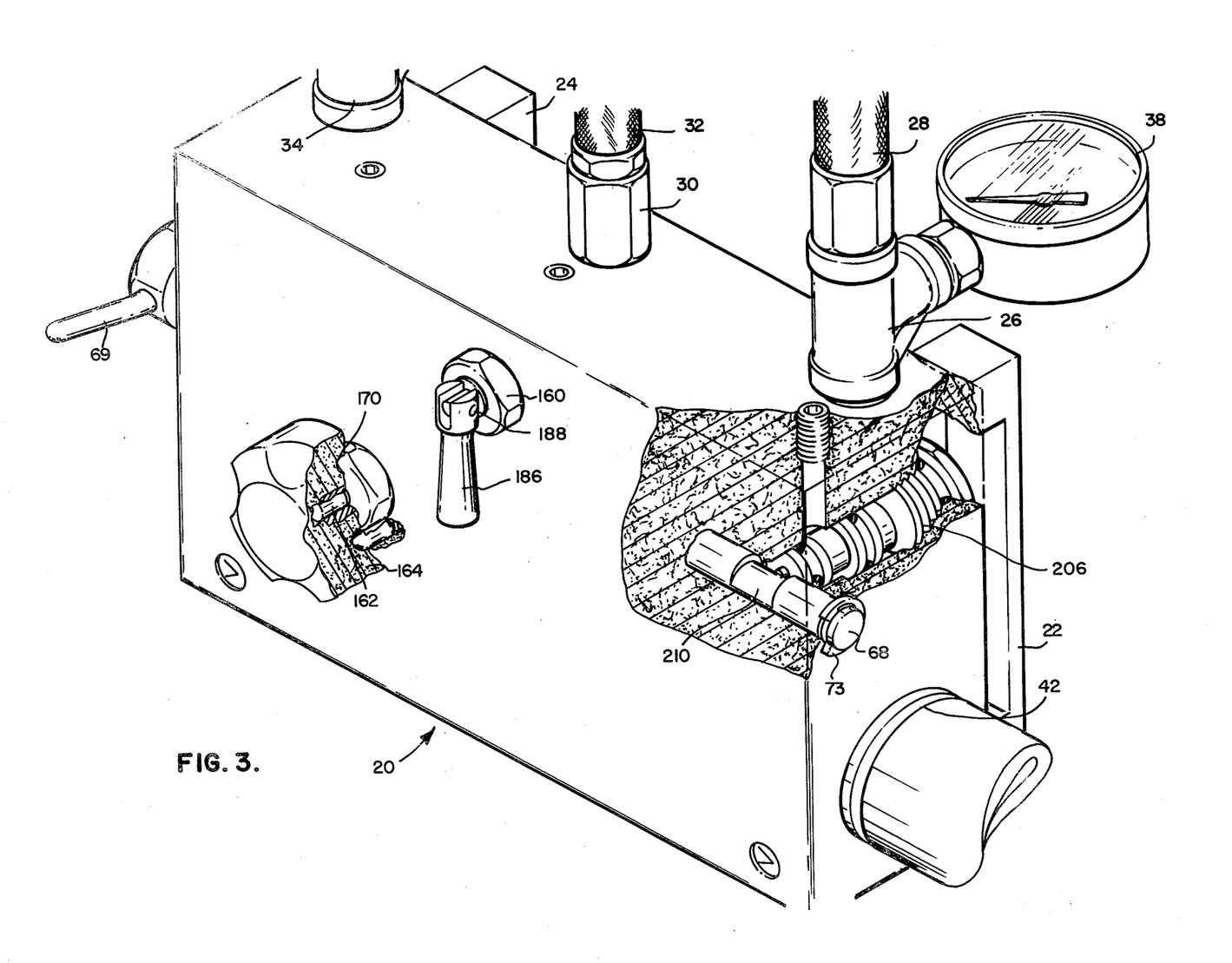
FIG. 3 is another perspective view of the invention taken from the opposite side as shown in FIG. 2 and showing portions broken away and in section to amplify the illustration.
Figures 7, 8, 9:
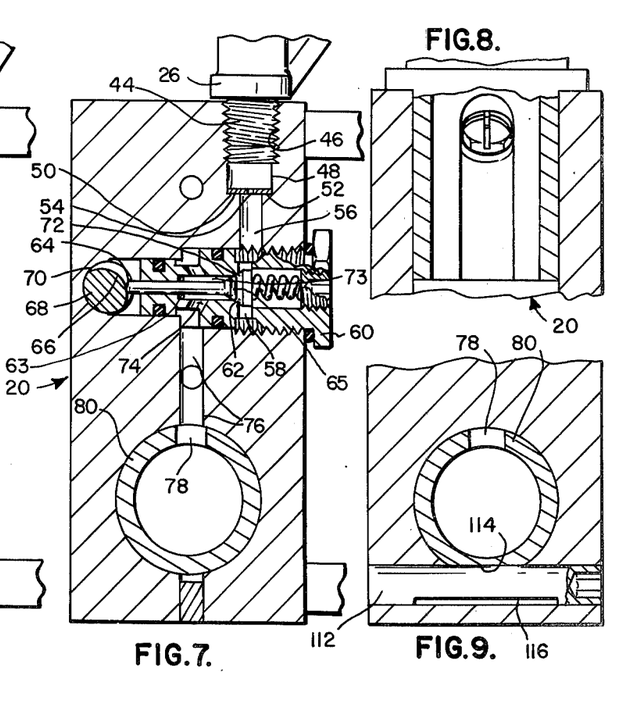
FIG. 7 is a view similar to FIG. 6 taken from the lines 7—7 of FIG. 4.
FIG. 8 is a fragmentary sectional view taken from the line 8—8 of FIG. 4.
FIG. 9 is a fragmentary sectional view taken from the line 9—9 of FIG. 4.

FIGS. 2 and 3 of the drawings show generally opposite sides of the body 20 and attention is therefore directed to FIGS. 2, 3 and 7 of the drawings which illustrate the fitting 26 which is provided with a screwthreaded portion 44 extending into an internally screwthreaded bore 46 in the body 20. Disposed in a reduced diameter bore 48 against a shoulder 50 and communicating with the fitting 26, is an orifice plate 52 having a metering orifice 54 therein. The metering orifice 54 communicates with a drilled passage 56 in the body and this communicates through ports 58 in a valve housing 60 with a poppet valve 62 having a stem 61 provided with an end 64 operable against an eccentric portion 66 of a cam shaft 68 which is rotatably mounted in a bearing bore 70 in the body 20.

Figure 14:
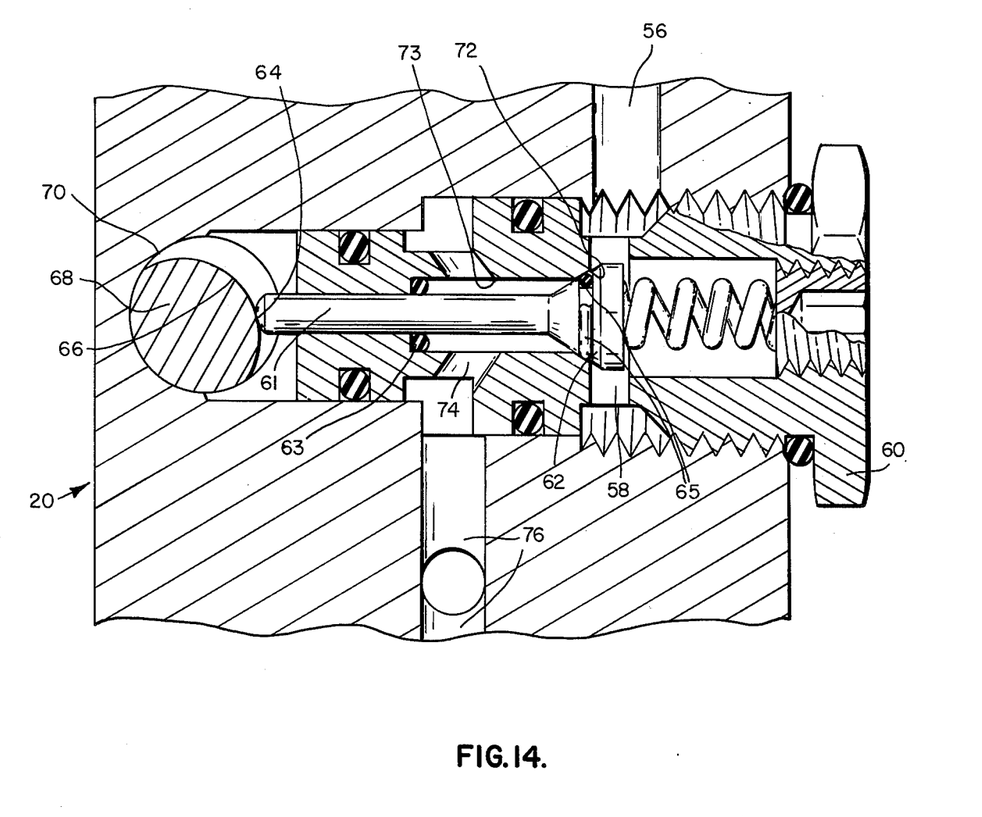
FIG. 14 is an enlarged fragmentary sectional view similar to FIG. 7.

As shown in FIGS. 7 and 14, an aqueous solution of detergent is adapted to pass under pressure through the orifice 54 and into the passage 56 and through radially disposed openings 58 in the valve housing 60 and when the poppet valve 62 and its soft O-ring 65 is opened relative to a seat 72 in the valve housing 60 an aqueous solution of detergent may flow through the openings 58 and through the valve seat 72 and bore 73 and through radially disposed openings 74 in the valve housing and into a passage 76 in the body 20. The valve stem 61 is seatingly surrounded by an O-ring 63 positioned in the bore 73. This passage 76 communicates through a slot 78 in the skirt 80 of a hollow plug 82 in an inlet end 84 of a mixing chamber 86 in which a hollow cylindrical cartridge 88 is disposed. The cartridge 88 is provided with a hollow cylindrical body 90 having an inlet end 92 and an outlet end 94. Held in the inlet end 92 by means of a snap ring 96 is a foraminous member, such as a screen 98 which retains "Delrin" plastic beads 100 in the inlet end 92 of the cartridge 88. A snap ring 102 maintains a foraminous or screen like member 104 in the outlet end 94 of the cartridge 88 to retain the "Delrin" beads in the tubular cartridge body 90 at the outlet end thereof.

The inlet end of the hollow cylindrical cartridge body 90 is abutted to an end 106 of the hollow cylindrical portion 80 of the plug 82 and the outlet end 94 of the cartridge 88 is abutted to an inner end 108 of a hollow cylindrical portion 110 of an outlet conduit fitting 42, as hereinbefore set forth.

The hollow tubular portion 80 of the cap plug 82 is retained in a bore 86 in the body 20 by means of a rotary locking member 112 which is circular in cross section and which engages in an arcuate in cross section transverse slot 114 in the hollow cylindrical skirt 80 of the plug 82.

As shown in FIG. 9 of the drawings, this rotary locking member 112 is provided with a chordally relieved portion 116 which, when rotated upwardly to coincide with the cylindrical skirt 80, will permit the skirt 80 to pass outwardly through the relief 116 so that the plug 82 may readily be removed together with its O-ring seal 118 so as to permit removal of the cartridge 88 when desired.

Figure 11:
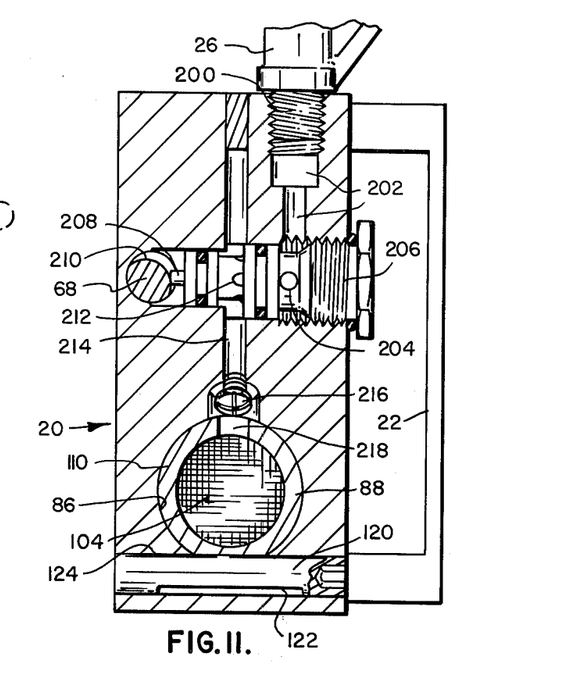
FIG. 11 is a reduced sectional view taken from the line 11—11 of FIG. 4.

Likewise, as shown in FIG. 11, a locking member 120 is provided with a relief portion 122 engageable in a transversely disposed arcuate slot 124 in the bottom of the hollow tubular portion 110 of the outlet conduit fixture 42.

Figure 4:
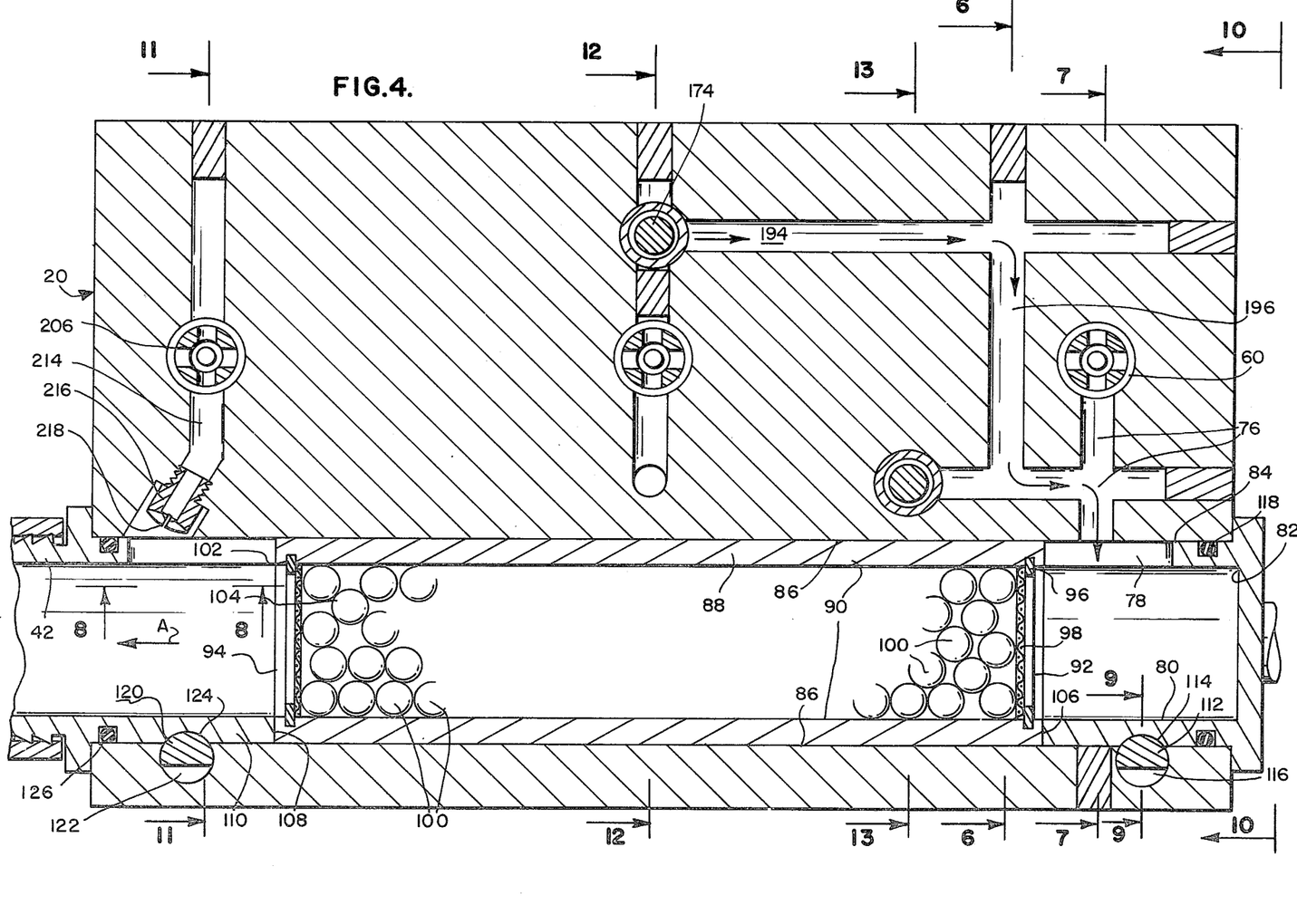
FIG. 4 is a longitudinal sectional view of the device of the invention.
Figure 5:
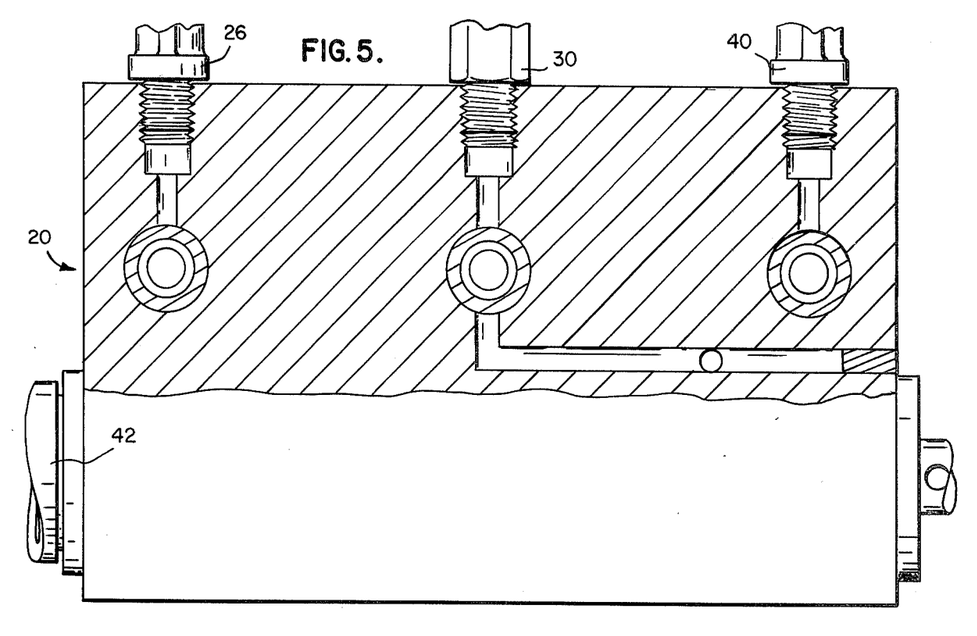
FIG. 5 is a side elevational view of the invention showing portions broken away and in section to amplify the illustration.
Figure 6:
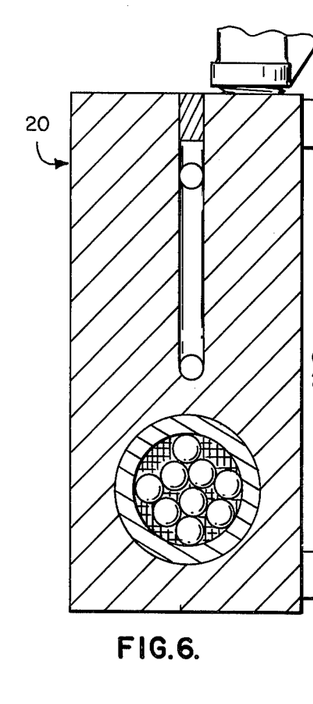
FIG. 6 is a reduced sectional view taken from the lines 6—6 of FIG. 4.

Thus, the delivery or outlet conduit connection 42 may be removed, together with its O-ring seal 126, all as shown best in FIGS. 4 and 11 of the drawings.

Figure 12:
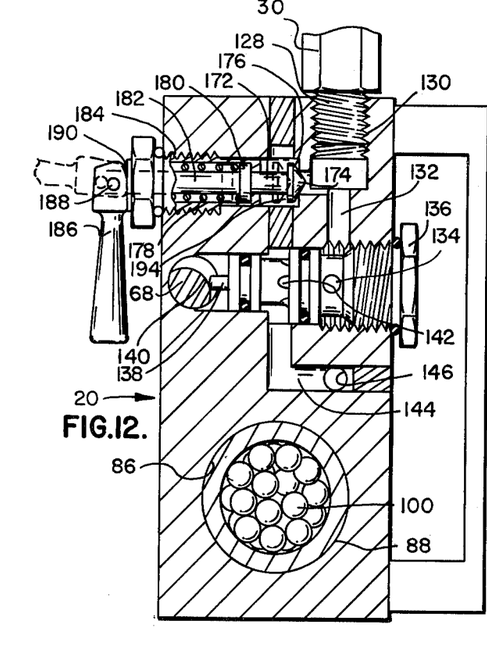
FIG. 12 is a sectional view similar to FIG. 11 taken from the line 12—12 of FIG. 4.

As shown in FIGS. 2 and 12, the fixture 30 coupled to the flexible air hose 32 is provided with an externally screwthreaded portion 128 which is screwthreaded in an internally screwthreaded bore 130 in the body 20 and this bore 130 is provided with a communicating passage 132 which communicates through ports 134 in a valve housing 136. This valve housing 136 is similar in construction to the valve housing 60 shown in FIG. 7 and a poppet valve 138 is similar to the poppet valve 62 hereinbefore described and is provided with a stem engaging an eccentric cam portion 140 of the crank shaft 68.

The valve housing 136 is provided with outlet ports 142 which communicate with a passage 144 which in turn communicates with a passage 146. This passage 146 communicates through another passage 148 with a conical portion 150 of a manually adjustable air metering valve shown in FIG. 13. This conical portion 150 seats against an annular seat 152 and when the conical portion is backed away from the seat 152, air may pass from the passage 146 into a passage 154 which communicates with a passage 155 which in turn communicates with the hereinbefore passage 76 and the slot 78 in the plug cap 82. Thus, compressed air and liquid detergent enter together the inlet 92 of the cartridge 88 hereinbefore described.

Accordingly, it will be appreciated that the flow of detergent through the orifice 54 shown in FIG. 7 is fixed and delivered at fixed pressure while the air flowing to mix with the liquid detergent at the inlet 92 of the mixing cartridge 88 may be coordinated such that with the adjustment of the valve portion 150 relative to the seat 152 will permit the operator to adjust the amount of air so that the density of the resultant foam, as will be hereinafter described, may be controlled. This control may be accomplished by increasing the amount of air to make the foam lighter or decreasing the amount of air to cause a relative heavy or more dense foam to be formed.

Figure 13:
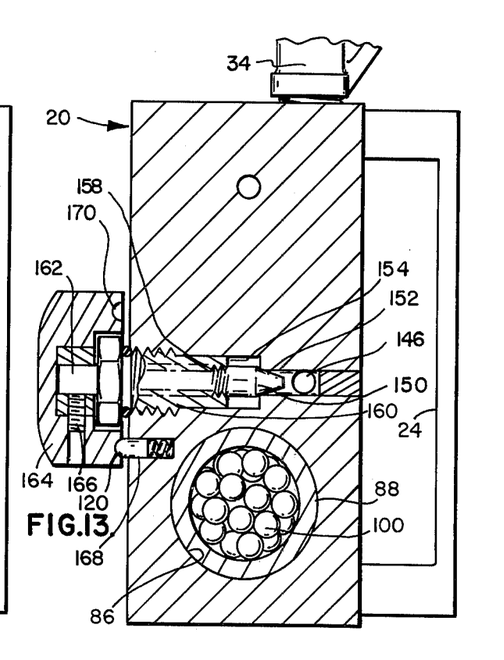
FIG. 13 is a sectional view similar to FIG. 12 taken from the line 13—13 of FIG. 4.

As shown in FIG. 13, it will be seen that the conical portion 150 of the inner flow control valve is provided with an externally screwthreaded portion 158 screwthreaded in a sleeve 160 which is screwthreaded in the body 20.

The screwthreaded portion 158 is provided with an external shaft portion 162 to which manually operable control knob 164 is connected by means of a set screw 166. A spring loaded detent structure 168 is engageable with recesses 170 in the knob 164 so as to provide for fixed settings of the air flow control valve shown in FIG. 13 and to prevent a change in adjustment thereof which might occur accidentally.

As shown in FIG. 12 of the drawings, a blow off valve 172 is provided with a poppet head 174 engaged on a seat 176 communicating with the passage 132 and with the outlet of the compressed air conducting fitting 130.

The poppet 174 is spring loaded by means of a spring 178 tending to hold the poppet 174 closed on the seat 176. This spring is substantially a high pressure spring and bears on a shoulder 180 of the valve stem integral with the poppet 174. The stem 182 is integral with the poppet 174 and surrounded by the spring 178; this structure being reciprocally mounted in an externally screwthreaded sleeve 184 and a tuggle arm 186 being pivotally coupled to the stem 182 by means of a pivot pin 188; the tuggle member having a cam portion 190 adapted to withdraw the valve stem 182 when the tuggle lever is moved to the broken line position shown in FIG. 12, thus removing the poppet head 174 from the seat 176 and allowing compressed air to move into a passage 194 shown in FIG. 2 of the drawings. The passage 194 communicates with the passage 196 which communicates directly with the passage 155 hereinbefore described, which in turn communicates with the passage 76 thereby allowing a high volume of compressed air to be passed through the blow off valve and into the inlet end 92 of the mixing chamber cartridge 88 for blowing detergent material therethrough and outward through the open outlet end 94 thereof, as will be hereinafter described in detail.

It will be seen that the passages 194 and 196 bypass the air flow control valve 136 which is identical in construction to the detergent flow control valve 60 having the poppet 62 therein.

As shown in FIGS. 2, 4 and 11, the flow of resin is through the fitting 26 which is provided with an externally screwthreaded portion 200 and the resin under pressure communicates with an internal passage 202 in the body 20; this passage 202 communicates with ports 204 in a resin flow control valve housing 206 and a poppet valve having a stem 208 is disposed in the housing 206 and this valve structure is identical to that shown and described in connection with FIG. 7 of the drawings. The stem 208 bears against an eccentric portion 210 of the cam shaft 68 so that the valve 208 may permit resin to flow through the passage 202 and through ports 204 and outwardly through ports 212 and downwardly through a passage 214 and outwardly through a spray nozzle 216 which is directed downwardly through a slot 218 in the hollow cylindrical portion 110 of the outlet or delivery connection 42.

As shown in FIG. 4 of the drawings, the spray nozzle 216 is provided with a restricted fan shaped orifice 218 which provides for the delivery of a fan shaped spray pattern, as shown in FIG. 2 of the drawings, which penetrates the cross section of foam composed of a foaming agent and compressed air as it moves in the direction of an arrow A shown in FIG. 4 of the drawings at the outlet of the mixing chamber of the invention, such that the resin is introduced downstream of the cartridge 88 and the area in which the foaming agent and air is mixed and wherein the foam is produced. Thus, the resin spray nozzle 216 is in a position wherein the resin does not collect and react in the mixing chamber cartridge 88 and wherein the resin is moved directly out of the mixing device of the invention and into the outlet or delivery fixture 42 which is coupled to the usual flexible hose which is adapted for use in placing the foam resin in structures or areas where it will cure and set up as a hard foam body.

Figure 10:
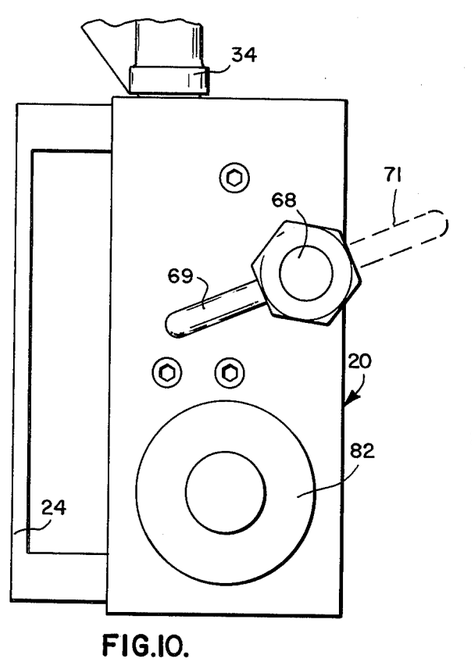
FIG. 10 is an end elevational view taken from the line 10—10 of FIG. 4.

As shown in FIGS. 3 and 10 of the drawings, the cam shaft 68 is provided with a handle 69 so as to permit the movement of the handle from the solid line position shown in FIG. 10 to the broken line position 71 shown in FIG. 10 to thereby actuate the poppet valves in the valve housings 60, 136 and 206 for controlling the flow of foaming agent, compressed air and resin respectively and thus, when the cam shaft lever 69 is in one position, the valves are open, and in another position, the valves are closed.

The opposite end of the cam shaft 68 from the lever 69 is longitudinally held in position by means of a snap ring 73 which fits into an external groove in the cam shaft and the snap ring abuts the respective end of the body 20 for maintaining longitudinal position of the cam shaft therein.

In accordance with the foregoing, it will be appreciated that the body 20 may be worn on the belt of the operator and one hand of the operator may operate the lever 69 of the cam shaft as well as to adjust the control knob 164 of the air metering valve as shown in FIG. 13. Thus, the operator may also actuate the blow off tuggle lever 186, as hereinbefore described, for completely blowing foaming agent out of the cartridge 88 as well as to purge the delivery fitting 142 and its connected delivery tube of reacting resin which has been introduced downstream of the cartridge 88 via the resin spray nozzle 216. It will be appreciated that the light, compact structure on the belt of the operator permits the operator to control the density of the foam by operating the air metering valve 150 and to maneuver the entire equipment into difficult to reach areas due to the compactness and light weight of the invention; the operator of such equipment may move into an attic in a building or other confined areas and the light weight, compact structure of the invention not only permits such movement of the operator, but also permits rapid control of the conditions of the foam, as well as the purging of the system following dispensation of the foam.

Additionally, the cam shaft 68, when operated by the handle 69, is very rapid for controlling the initial turn on of the foaming agent, resin and compressed air or immediately shutting off all three as desired.

According to the invention, the foam and resin mixing and delivery device is particularly adapted for use in mixing urea formaldehyde resin, compressed air and a suitable foaming agent, such as a detergent type material adapted to create foam when mixed with compressed air.

It will be obvious to those skilled in the art that various modifications may be resorted to without departing from the spirit of the invention.

I claim:

1. In a foam resin mixing and delivery device,
   (a) a block housing;
   (b) conduit means formed in said block housing and including:
      (i) compressed air inlet means substantially midway of said block housing,
      (ii) resin inlet means at one end of said block housing, and
      (iii) foaming agent inlet means at the other end of said block housing;
   (c) delivery conduit means connected to said housing;
   (d) an air flow control valve operatively associated with said compressed air inlet means;
   (e) a foaming agent valve associated with said foaming agent inlet means,
   a mixing chamber having:
      (i) an outlet communicating with said delivery conduit,
      (ii) an inlet receiving compressed air and foaming agent from said compressed air inlet means and said foaming agent inlet means via said air and foaming agent flow control valves;
   a removable cartridge having means for mixing said compressed air and said foaming agent;
   (g) a resin flow control valve operatively associated with said resin inlet means and controlling the flow of resin to said outlet of said mixing chamber;
   said air, resin and foaming agent inlet means; said mixing chamber and outlet thereof; and said valves all being disposed within said block housing; and
   (h) a manually operable camshaft rotably mounted in said block housing and having cam portions for concurrently opening and closing said compressed air flow control valve, said resin flow control valve and said foaming agent flow control valve.

2. The invention as defined in claim 1, wherein: a manually operable blow off valve is disposed within said block housing and in communication with said compressed air inlet means; said blow off valve being disposed in said conduit means to bypass said compressed air flow control valve, said blow off valve communicating with said inlet of said mixing chamber whereby said blow off valve when opened is adapted to introduce a sufficient amount of compressed air into said mixing chamber to purge said mixing chamber of said foaming agent and to purge said delivery conduit means of foaming agent and resin which may collect therein.

3. The invention as defined in claim 1, wherein: a resin spray nozzle is disposed in communicating relationship with said resin flow control valve; said nozzle supported in said conduit means and disposed to spray resin into foamed foaming agent in said outlet of said mixing chamber.

4. The invention as defined in claim 1, wherein: said cartridge is provided with a hollow body having an inlet and an outlet; said inlet and outlet of said body being adjacent said inlet and said outlet respectively of said mixing chamber; said means for mixing comprising plastic beads in said body; said hollow body having foraminous elements at said inlet and said outlet thereof for retaining beads in said body; a resin spray nozzle communicating with said resin flow control valve and supported in connection with said conduit means and disposed to spray resin into foamed foaming agent in said outlet of said mixing chamber and in spaced relation to said outlet of said cartridge.

5. The invention as defined in claim 1, wherein: said cartridge is provided with a hollow body having an inlet and an outlet; said inlet and said outlet of said hollow body being adjacent said inlet and said outlet respectively of said mixing chamber; said means for mixing comprising plastic beads in said body; said hollow body having foraminous elements at said inlet and said outlet respectively for retaining said beads in said body; a resin spray nozzle communicating with said resin flow control valve and said nozzle supported in connection with said conduit means and disposed to spray resin into foamed foaming agent in said outlet of said mixing chamber; said spray nozzle being in spaced relation to said outlet of said cartridge; a manually operable blow off valve communicating with said compressed air inlet; said blow off valve being disposed in said conduit means to by pass said compressed air flow control valve, said blow off valve communicating with said inlet of said mixing chamber whereby said blow off valve when opened is adapted to introduce a sufficient amount of compressed air into said mixing chamber to purge said mixing chamber of said foaming agent and to purge said delivery conduit means of foaming agent and reacting resin.

6. The invention as defined in claim 1, wherein: a resin spray nozzle is disposed in communication with said resin flow control valve to receive resin therefrom; said spray nozzle being supported in connection with said conduit means and disposed to spray resin into foamed foaming agent in said outlet of said mixing chamber; a manually operable blow off valve communicating with said compressed air inlet; said blow off valve disposed in said conduit means to by pass said compressed air flow control valve; said blow off valve communicating with said inlet of said mixing chamber, whereby said blow off valve, when opened, is adapted to introduce a sufficient amount of compressed air into said mixing chamber for purging said mixing chamber of foaming agent and for purging said delivery conduit means of reacting resin.

7. The invention as defined in claim 1, wherein: a manually adjustable metering valve is carried by said block housing and disposed to adjust air flow volume from said compressed air flow control valve into said inlet of said mixing chamber.

8. The invention as defined in claim 1, wherein: a metering orifice is disposed in said block housing between said foaming agent flow control valve and said inlet of said mixing chamber.

9. The invention as defined in claim 1, wherein: said cartridge is provided with a hollow body having an inlet and an outlet; said inlet and said outlet of said cartridge being adjacent said inlet and said outlet respectively of said mixing chamber; said means for mixing comprising plastic beads in said cartridge; said cartridge having a hollow body containing said plastic beads and be further provided with foraminous elements at said inlet and said outlet of said cartridge for retaining said beads in said hollow body.

10. The invention as defined in claim 9, wherein: a resin spray nozzle is disposed in communicating relationship with said resin flow control valve and said nozzle is supported in said conduit means and disposed to spray resin into foamed foaming agent in said outlet of said mixing chamber and in spaced relation to said outlet of said cartridge.

11. The invention as defined in claim 1, wherein: said mixing chamber is provided with a cartridge therein; said replaceable cartridge being provided with plastic beads for mixing said compressed air and foaming agent and being further provided with a foraminous inlet and outlet.

12. The invention as defined in claim 11, wherein: a manually operable blow off valve is disposed in communicating relationship with said compressed air inlet; said blow off valve being disposed in said conduit means to deliver compressed air to said inlet of said mixing chamber and operable for conducting compressed air through said cartridge for purging foaming agent therefrom.

13. The invention as defined in claim 11, wherein: said flow control valves are poppet valves; in said block housing.

* * * * *